DUAL MODULATED SINGLE CARRIER FREQUENCY REMOTE CONTROL

Filed Dec. 27, 1966 3 Sheets-Sheet 1

INVENTORS
ROBERT W. LESTER
EDMUND TRUNK
BY
ATTORNEY

July 21, 1970 R. W. LESTER ET AL 3,521,267

DUAL MODULATED SINGLE CARRIER FREQUENCY REMOTE CONTROL

Filed Dec. 27, 1966 3 Sheets-Sheet 2

INVENTORS
ROBERT W. LESTER
EDMUND TRUNK

BY [signature]

ATTORNEY

DUAL MODULATED SINGLE CARRIER FREQUENCY REMOTE CONTROL

INVENTORS
ROBERT W. LESTER
EDMUND TRUNK

BY [signature]

ATTORNEY

United States Patent Office 3,521,267
Patented July 21, 1970

3,521,267
DUAL MODULATED SINGLE CARRIER FREQUENCY REMOTE CONTROL

Robert W. Lester, Manhasset, and Edmund Trunk, East Meadow, N.Y., assignors, by mesne assignments, to Mastercraft Electronics Corp., New York, N.Y., a corporation of New York Filed Dec. 27, 1966, Ser. No. 604,843
Int. Cl. H04b *3/54;* H04m *11/00*
U.S. Cl. 340—310 9 Claims

ABSTRACT OF THE DISCLOSURE

A single radio frequency remote control system particularly useful for transmission of control signals over conventional power lines and embodying at least one radio frequency oscillator for the generation of a carrier signal and means for selectively modulating the carrier signal to produce two different types of control signals and a responsive receiver involving means for demodulating the carrier signals and control means selectively responsive to the demodulated signals.

This invention relates to electronic control systems and more specifically to a novel and improved remote control system utilizing a single carrier frequency for operation of the remotely located receiving portion of the system.

While it will become apparent that the apparatus in accordance with the invention is useful in a wide variety of applications, it is particularly adaptable for the transmission of control signals over conventional power lines. Through the utilization of novel and improved circuitry, selective operation of remotely located switching means is effected. Moreover, this end is attained through the utilization of a novel and improved arrangement of electronic circuits characterized by their simplicity, stability, and ease with which the transmitter and receiver may be aligned for proper operation of the apparatus.

Another object of the invention resides in the provision of a novel and improved electronic remote control system embodying improved means for modulating a transmitting oscillator and improved means for detecting the oscillator signal to provide selective operation of switching means in response to the detected signals.

A still further object of the invention resides in the provision of a novel and improved remotely controlled receiver embodying improved detecting means sensitive to selected characteristics of the received signal to operate associated switching means.

The above and other objects of the invention will become more apparent from the following description and accompanying drawings forming part of this application.

Figure 1:
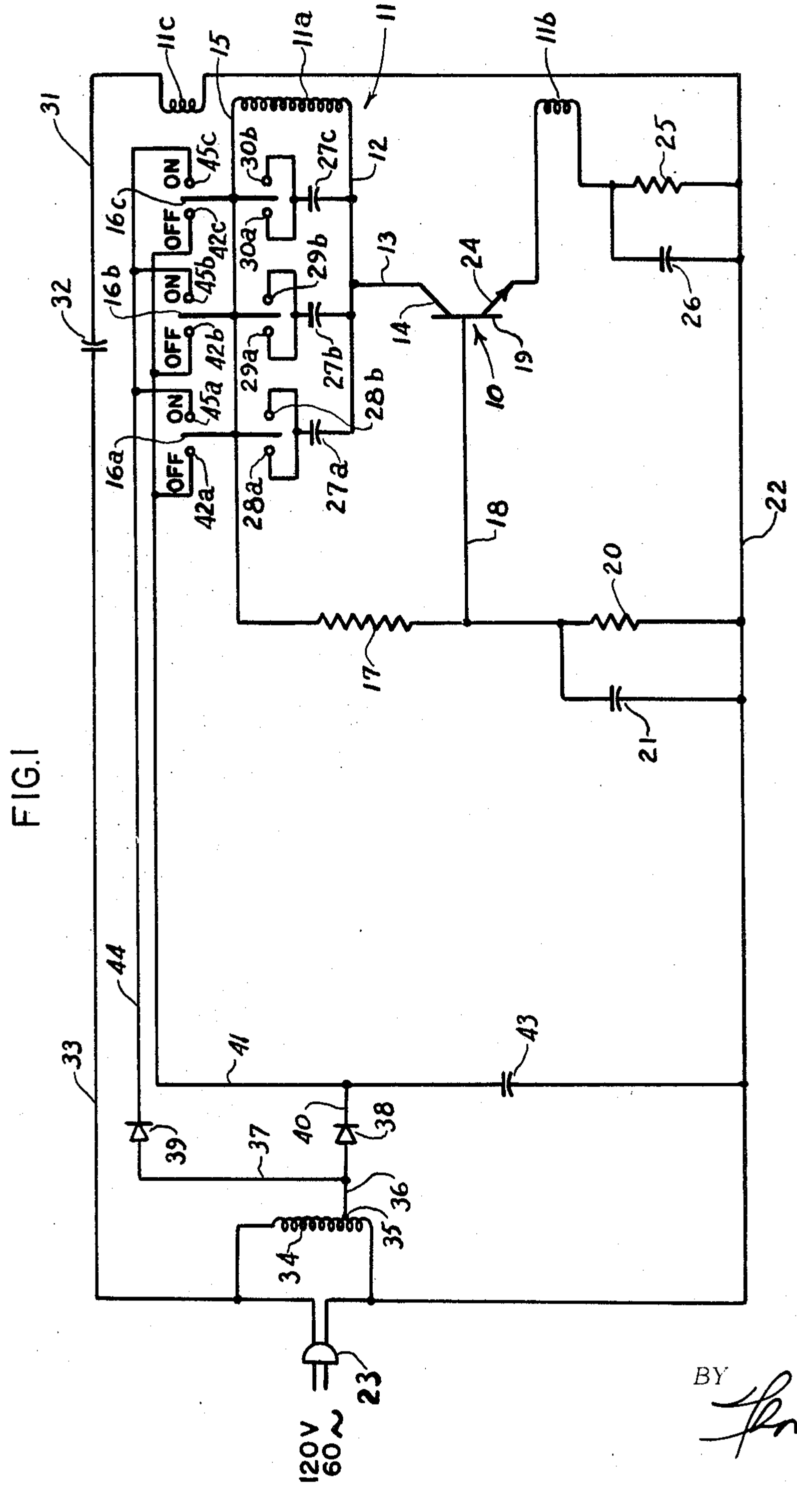
FIG. 1 is a circuit diagram of one embodiment of a modulated single carrier frequency transmitter in accordance with the invention.
Figure 2:
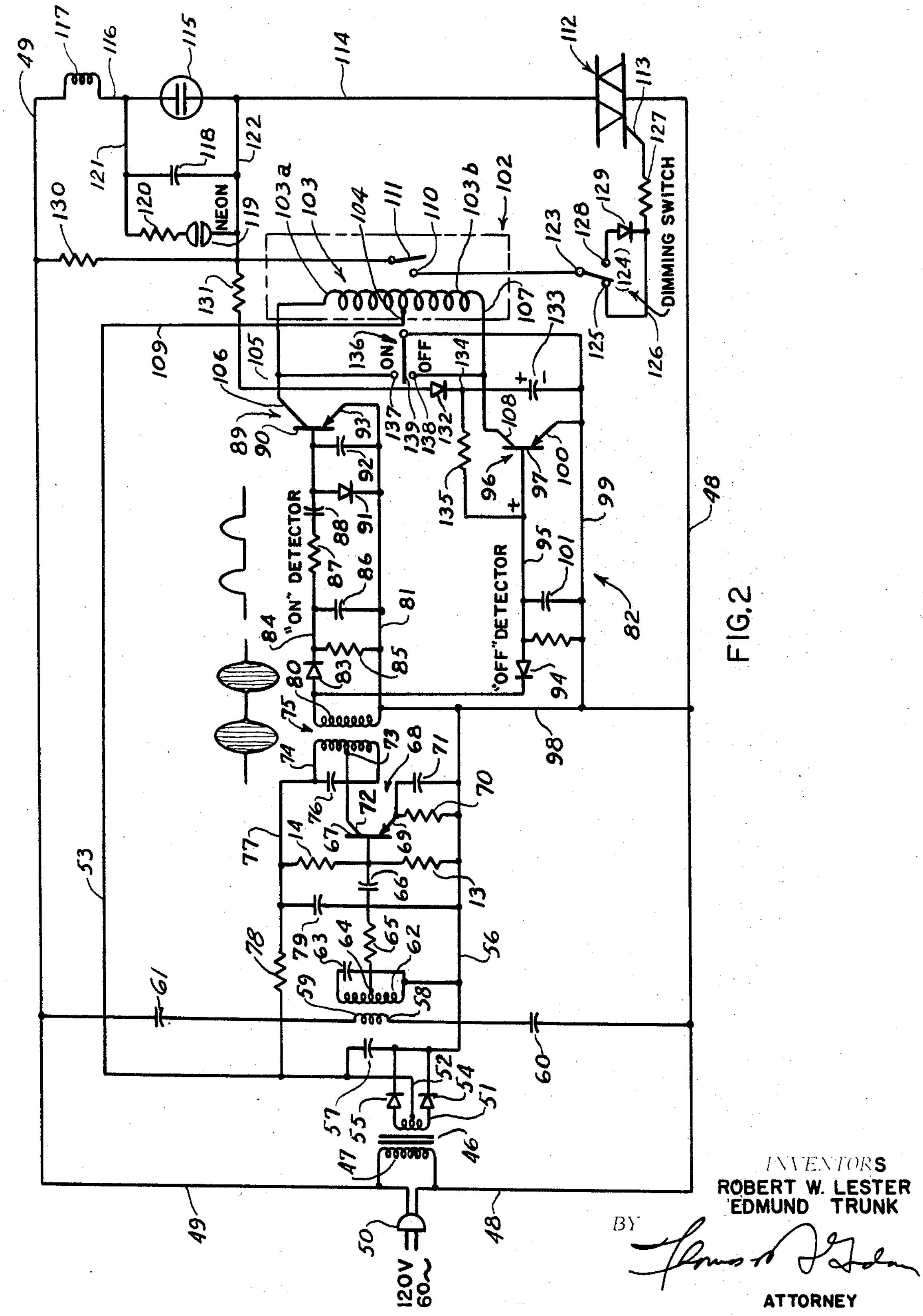
FIG. 2 is a circuit diagram of a remotely controlled receiver for use with the transmitter of FIG. 1.

One form of the single frequency control system in accordance with the invention is shown in FIGS. 1 and 2 with FIG. 1 illustrating a modulated transmitter and FIG. 2 illustrating a cooperating receiver. This control system is designed for operation over conventional alternating current power lines so that the transmitter and receiver can be placed in different rooms of a building without the need for special lines and with minimum radiation of the radio frequency control signals.

Referring now to FIG. 1, the radio frequency oscillator includes a transistor 10 and a radio frequency transformer 11 having plate coil or tank 11*a*, a feed-back winding 11*b*, and an output winding 11*c*. One side of the tank coil 11*a* is connected via leads 12 and 13 to the collector 14 of transistor 10. The top side of the coil 11*a* is connected through a lead 15 to the contact arms 16*a*, 16*b*, and 16*c* of a series of control switches and thence through a resistor 17 and a lead 18 to the base 19 of transistor 10. A second resistor 20 with a condenser 21 in parallel therewith is connected between the lead 18 and the conductor 22 which connects to one side of the AC plug 23. As will become apparent the resistors 17 and 20 are proportioned to provide the desired bias for the base 19. The emitter 24 is connected through the coil 11*b* and thence through the resistor 25 to the conductor 22. A condenser 26 is connected in parallel therewith to prevent degeneration in the emitter circuit.

The frequency of oscillation of the transmitter is determined by the condensers 27*a*, 27*b*, and 27*c*, in combination with the coil 11*a*. The three different condensers enable the operation of three individual remotely located receivers and therefore if only one receiver is to be utilized it is obvious that only one condenser 27 is required. The condenser 27*a* is connected between lead 12 and switch contacts 28*a* and 28*b*. Condenser 27*b* is similarly connected between lead 12 and contacts 29*a* and 29*b*, and the condenser 27*c* is connected from the lead 12 to contacts 30*a* and 30*b*. Thus when any one of the switch levers 16 is moved to the left or to the right it connects the associated condenser with the lead 15. The output signal is impressed upon the alternating current supply circuit by the coil 11*c* which is connected at one side to the lead 22 and at the other side through a lead 31, an isolating condenser 32 and lead 33 to the plug 23.

Energy for operation of the oscillator is obtained from an autotransformer having a winding 34 which is tapped at 35 to provide the desired low voltage for operation of the oscillator. The winding 34 is connected between the leads 22 and 33 and the voltage applied to the transistor is that proportion of the voltage developed between the tap 35 and the lead 22. It is evident, however, that the autotransformer may be replaced by an isolating transformer having two windings.

In order to provide two selected forms of modulation for the oscillator, which is collector modulated, the tap 35 is connected via the leads 36 and 37 to two diodes 38 and 39. The output side of the diode 38 is connected via leads 40 and 41 to the switch contacts 42*a*, 42*b*, and 42*c*. In addition, a filter condenser 43 is connected between the lead 40 and the lead 22 to provide filtered direct current on the lead 41. With this arrangement as each of the switch levers 16 is moved to the left, the associated condenser 27 is connected to the lead 15 and at the same time a filtered direct current is also applied to the lead 15 so that the transmitter produces a continuous radio frequency signal which is fed to the plug 23 and thus into the wiring of the building. A second form of transmitter signal is produced by feeding the unfiltered output voltage from the rectifier 39 to the lead 15. This is accomplished by the lead 44 which connects the diode 39 to the switch contacts 45*a*, 45*b*, and 45*c*. Thus when the switch levers 16*a* through 16*c* are moved to the right as shown in the drawing, a pulsed RF signal is produced in the winding 11*c* and fed to the power line.

The receiver for use in combination with the transmitter as described above is shown in FIG. 2. The receiver includes a power supply having a transformer 46 with the primary 47 connected across the leads 48 and 49. The leads 48 and 49 are connected to a plug 50 which connects with the building power lines. The secondary 51 of transformer 46 has a centertap 52 connected to the negative supply conductor 53 and a pair of diodes 54 and 55 connected to the outer terminals of the winding 51 and to the conductor 56 forming the positive supply conductor. A condenser 57 is connected from the output side of the diodes to the lead 53 to provide a filtered output voltage. Radio frequency energy is obtained from the power line by the primary 58 of the RF transformer 59. One side of the primary 58 is connected through an isolating condenser 60 to the lead 48 while the other side is connected through another isolating condenser 61 to the lead 49. The secondary 62 of the transformer 59 has a condenser 63 connected in parallel therewith to tune the secondary to a selected frequency. One side of the secondary is connected to the lead 56 while a tap 64 is connected through a resistor 65 and a condenser 66 to the base 67 of transistor 68.

The emitter 69 of transistor 68 is connected by a resistor 70 to the lead 56 and this resistor is bypassed by a condenser 71. Collector 72 is connected to a tap 73 on winding 74 of a RF transformer 75, and the winding is bridged by a condenser 76 to tune it to a selected frequency. The top side of winding 74 is connected through a lead 77 and a filter resistor 78 to the lead 53 and a filter condenser 79 is connected between the leads 77 and 56. With this arrangement an amplified RF signal will appear across the secondary winding 80 of the transformer 75, and this energy is fed to two detectors generally denoted by the numerals 81 and 82.

The detector 81 in the instant embodiment of the invention is called the "on" detector and operates control means to apply energy to a load as will be described. This detector includes a diode 83 connected at one side to the winding 80 and at the other side to a lead 84. A resistor 85 and a condenser 86 are connected between the lead 84 and a lead 86, the latter being connected to the other side of the winding 80. This arrangement operates to remove one side band of the RF signal and at the same time filters out the radio frequency component, thus leaving the original pulsed signal on the lead 84. The signal on lead 84 is fed through a network comprising a resistor 87 and a condenser 88 to the base 90 of transistor 89. The base 90 of transistor 89 is also coupled to the lead 81 by a diode 91 and condenser 92 in parallel, and the lead 81 is connected to the emitter 93 of transistor 89. With this arrangement the pulsed signal from the transmitter will cause the transistor 89 to conduct while the continuous signal produced by the transmitter will not activate the transistor 89.

The off-detector is generally denoted by the numeral 82 and comprises a diode 94 connected at one side to the winding 80 and at the other side through a lead 95 to a base 97 of transistor 96. The other side of the winding 80 is connected through leads 98 and 99 to the emitter 100 of transistor 96. The lead 98 is also connected to the lead 48 which connects with the plug 50. A condenser 101 bridges the leads 95 and 99 to remove radio frequency energy and the signal appearing on the lead 95 is a continuous DC voltage. This DC signal or voltage activates the transistor 96 causing it to conduct.

In the instant embodiment of the invention a dual coil latching type relay generally denoted by the numeral 102 is utilized in connection with the detector. This relay has a coil 103 which is centertapped at 104. The outer terminal of the coil section **103*a* is connected via a lead 105 to the collector 106 of transistor 89. The outer terminal of the coil section 103*b* is connected via the lead 107 to the collector 108 of transistor 96. The centertap 104 is connected via a lead 109 to the lead 53. The switch contacts 110 and 111, diagrammatically illustrated in the figure, operate to close when the coil section 103*a* is energized and open when the coil section 103*b* is energized. It is to be understood that the coils do not need to be continuously energized but need only be energized for a period of time sufficient to cause the operation of the switch. With this arrangement when the transmitter is operated to transmit a pulsed signal, the detector 81 will respond to close the switch contacts 110 and 111, while if a continuous signal is transmitted, the detector 82 will respond to open the contacts 110 and 111**.

If a device requiring small amounts of energy for operation is to be controlled by the receiver, such control can be obtained by utilizing contacts 110 and 111 to open and close the energizing circuit. With devices requiring large amounts of energy, such as electric lamps and the like, semiconductor switching means in the form of a triac 112 is utilized. A triac is equivalent to two silicon controlled rectifiers connected back to back but has a single control electrode 113. One side of the triac 112 is connected through the lead 48 to the plug 50 while the other side of the triac is connected through lead 114 to one terminal of an electric outlet 115. The other side of the outlet 115 is connected through a lead 116 to a toroidal choke 117 and to the lead 49. With this arrangement a device to be energized when connected to the outlet 115 will be energized when the triac 112 is in a conducting condition and will be de-energized when in a nonconducting condition. A condenser 118 connected across the terminals of the outlet operates in conjunction with the choke 117 to block any interference, generated by the device being energized, so that it cannot affect the operation of the remote control system. A neon lamp 119 and a resistor 120 are connected in series across the leads 121 and 122 to indicate when the load is energized. When the load is de-energized, the neon lamp 119 will glow but when it is energized, the neon lamp 119 will be extinguished.

Operation of the triac 112 is accomplished by a circuit including leads connecting the switch contact 111 to the lead 122 and the switch contact 110 to the contactor 123 of a single pole double throw switch generally denoted by the numeral 124. The circuit further includes a connection from contact 125 of the switch through a lead 126 and resistor 127 to the control electrode 113. The switch contact 128 is connected through a diode 129 to the lead 126. A resistor 120 is connected between the lead 122 and the lead 149.

With the foregoing arrangement when the switch contacts 110 and 111 are closed, energy will be fed through the switch 124 to the electrode 113 and cause the triac 112 to conduct. If the contactor 123 of switch 124 is on the switch contact 125, then the triac 112 will conduct on both halves of each alternating current cycle. If the switch contactor 123 engages the contact 128, then the rectifier or diode 129 will energize the triac 112 during one half cycle of each alternating current cycle. This is useful in connection with energizing electric lamps as the introduction of the diode 129 will function to reduce the brightness of the energized lamp.

Referring again to the detectors 81 and 82, the detector 82 can be activated by both the pulsed signal as well as the continuous signal, and it is therefore desirable to inactivate the detector 82 when the receiver is in the off condition. For this purpose a resistor 131, a diode 132, and a condenser 133 are connected in series between the lead 122 and the lead 99. This arrangement produces a filtered positive potential at the junction 134. This potential is fed through the resistor 135 to the base 97 of transistor 96 and polarizes the base positively. A high positive voltage will occur when the voltage contacts 110 and 111 are open so that the application of either pulsed or continuous signals will not cause the transistor 96 to conduct. With this arrangement, therefore, a pulsed signal will cause detector 81 to operate and close the switch contacts 110 and 111. In so doing, voltage appearing at the junction 134 reduces substantially to zero so that the application of the continuous signal thereafter will cause the transistor 96 to conduct and open the switch contacts 110 and 111.

For convenience a manually operated switch 136 is provided so that the load can be energized or de-energized at the receiver. For this purpose one switch contact 137 is connected to the lead 107. The movable contactor 139 connects to the lead 99. In this way the relay 102 can be manually operated.

Figures 3, 6:
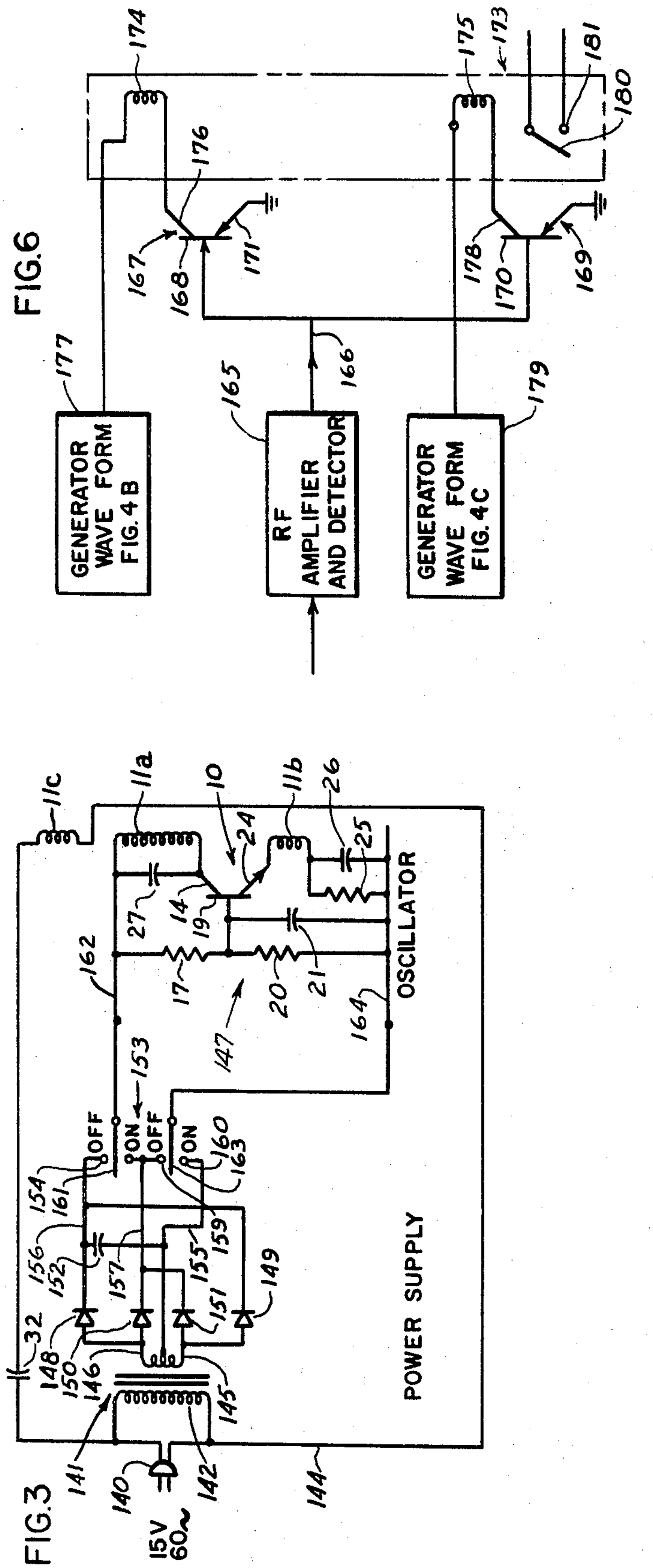
FIG. 3 is a circuit diagram of a modified form of modulated transmitter in accordance with the invention.
FIG. 6 is a schematic circuit diagram of a receiver for use in cooperation with the modulator transmitter of FIG. 3.

A modified embodiment of the invention is illustrated in FIGS. 3 through 6. Referring to FIG. 3 which illustrates a transmitter in accordance with the invention, it will be observed that the transmitter is connected to an alternating current circuit by means of a conventional plug 140 to obtain power for operation of the transmitter and at the same time feed radio frequency energy into the circuit for transmission to a remote location. The power supply comprises a transformer 141 having a primary 142 connected to conductors 143 and 144 which are in turn attached to the plug 140. The secondary 145 of transformer 141 is centertapped at 146 and it supplies energy for operation of the oscillator generally denoted by the numeral 147. Since the oscillator 147 is collector modulated as will be described, the alternating current energy from the winding 145 is treated by rectifiers 148 through 151, and condenser 152 to produce two different types of pulsed signals which both energize and modulate the oscillator. A double pole double throw switch 153 enables the selection of one pulse signal or the other for use in effecting the desired operation of the cooperating receiver.

Figures 4, 5:
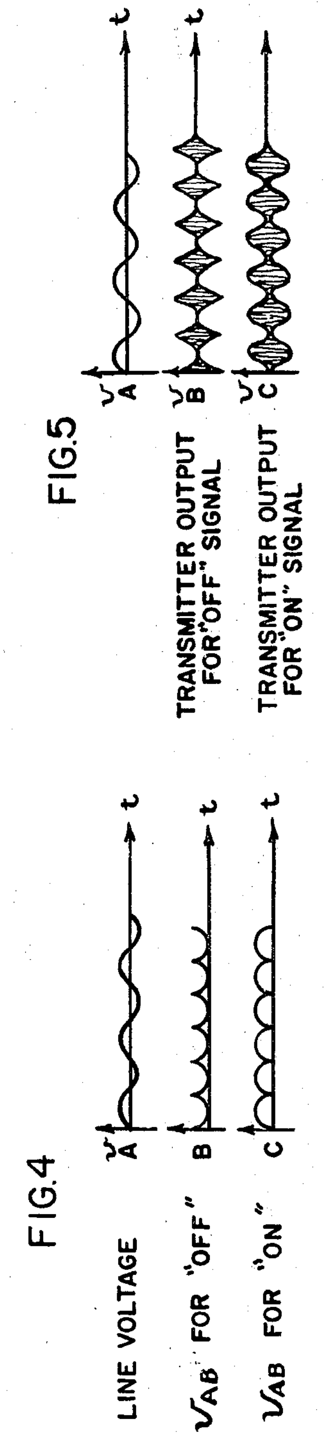
FIG. 4 illustrates graphs of two different signals produced by the modulator of FIG. 3.
FIG. 5 illustrates graphs representing two different output signals from the transmitter of FIG. 3 produced by the modulator signals of FIG. 4.

More specifically, rectifiers 148 and 149 are connected to opposite sides of the winding 145 and the outputs of the rectifiers are connected together and to the switch contactor 154. A condenser 152 is connected between the lead 155 which connects to the centertap 146 and to the lead 156 so that the voltage measured between the leads 155 and 156 will be an essentially DC voltage. The rectifiers 150 and 151 are also connected to the winding 145 to form a second full wave rectifier. The output of these rectifiers appears on lead 157 which is connected to the switch contacts 158 and 159. The voltage appearing between the leads 155 and 157 will therefore be in the form of a plurality of pulses synchronized with the alternating current frequency. The lead 155 is also connected to the switch contact 160. The movable contactor 161 of switch 153 can be moved to engage either contact 154 or 158 and is connected to a conductor 162. The movable contactor 163 can engage either contacts 159 or 160 and is connected to a lead 164. With this arrangement and with the contacts 161 and 163 in the lower position, as shown in the drawing, a signal will be produced between the leads 162 and 164 as illustrated at C in FIG. 4. It will be observed that the unidirectional pulse signal illustrated at C in FIG. 4 is synchronized with the alternating current shown at A in FIG. 4. When the switch contacts 161 and 163 are moved to the upper positions as shown in the drawing, a signal will appear between the leads 162 and 164 which has the form illustrated at B in FIG. 4. In effect this signal constitutes the difference between the DC signal produced by rectifiers 148 and 149 and condenser 152 and the unidirectional pulsed signal produced by rectifiers 150 and 151.

The oscillator 147 is substantially identical to the oscillator described in connection with FIG. 1, and accordingly, corresponding elements of the oscillators have been denoted by like numerals. For convenience, however, the oscillator 147 is illustrated with a single condenser 27 which together with the tank coil 11*a* determines the radio frequency at which the circuit will oscillate. Since the oscillator is both powered and modulated by the energy appearing between the leads 162 and 164, the output signal fed into the line by the winding 11*c* and condenser 32 will have the forms shown in FIG. 5 wherein graph A represents the alternating current frequency, graph B represents the signal transmitted when the switch contacts 161 and 163 are moved to the upward or off position and graph C represents the radio frequency signal when the contacts 161 and 163 are moved to the downward or on position. It will be observed from FIG. 5 that the pulses at B are displaced 90 degrees from the pulses at C and further that the peak energy of each pulse shown at B occurs in synchronism with a node of the alternating current illustrated at A.

Referring now to FIG. 6 which illustrates a receiver in simplified form, it will be observed that a single RF amplifier and detector 165 is employed. The RF amplifier may be in the form of the amplifier illustrated in FIG. 2 and connected to the alternating current line in a similar fashion. The detector may correspond to either detector 81 or 82 as shown in FIG. 2 since either detector will produce a demodulated pulsed output when pulses such as those shown in FIGS. 5B and 5C are impressed thereof. The pulses appearing on the lead 166 from the amplifier and detector 165 will correspond to the energy pulses shown in FIGS. 4B and 4C. The lead 166 of the amplifier and detector 165 is connected to the base 168 of transistor 167 and to the base 170 of transistor 169. The emitters 171 and 172 are returned to ground. The latching relay 173 which is similar to the relay of FIG. 2 has two coils 174 and 175. One side of the coil 174 is connected to the collector 176 of transistor 167 while the other side of the coil is connected to a generator 177 which produces a wave form corresponding to the wave form shown in FIG. 4B and in phase therewith. The coil 175 has one side connected to the collector 178 of transistor 169 and the other side connected to a generator 179 which produces a wave form corresponding to the wave form shown in FIG. 4C. The relay includes contacts 180 and 181 which correspond to the contacts 110 and 111 of FIG. 2.

With the arrangement as described above when the transmitter is operated to apply the wave form shown in FIG. 4B to the oscillator 147, it will produce a modulated signal such as that illustrated at FIG. 5B and this signal upon arrival at the RF amplifier and detector 165 will be demodulated and applied to both transistors 167 and 169. Since this signal which corresponds to the signal illustrated at 4B is in phase with the generator 177, it will energize the coil 174 to open the contacts 180 and 181. This signal however is out of phase with the generator and, therefore, will not produce an appreciable signal across the coil 175. On the other hand, when the transmitter is operated to produce a modulated output signal as illustrated in FIG. 5C, the output of the detector will correspond to the pulse signal illustrated at FIG. 4C. Since this signal is in phase with the signal from the generator 179 and out of phase from the signal from generator 177, only the coil 175 will be energized and this will function to close the contacts 180 and 181.

It is to be understood that the receiver shown in FIG. 6 may also include a semiconductor switch for operation of large loads as illustrated and described in connection with the receiver shown in FIG. 2. The receiver of FIG. 6 may also include an interference limiting network and a dimming circuit both of which are described in FIG. 2.

While only certain embodiments of the invention have been illustrated and described, it is apparent that alterations, modifications and changes may be made without departing from the true scope and spirit thereof as defined by the appended claims.

What is claimed is:

1. A single radio frequency remote control system comprising a radio frequency signal transmitter including an electronic oscillator generating radio frequency carrier signal and modulating means connected with said oscillator for producing selectively at least two different radio frequency signals having the same carrier frequency, at least one of said signals being pulse modulated, and a receiver for receiving said transmitted signals, said receiver including detecting means producing two different demodulated signals and switching means connected to said detector, said switching means closing in response to one of said demodulated signals and opening in response to the other of said signals.

2. A single radio frequency remote control system according to claim 1 wherein said oscillator includes a transistor having a collector, said modulating means comprises an alternating voltage source and a rectifier producing a unidirectional pulsed energy source for energizing and collector modulating said oscillator and a constant voltage energy source for continuously energizing said oscillator, said receiver detecting means includes one detector producing a voltage in response to said pulsed radio frequency signal and another detector producing a voltage in response to said other signal and said switching means is a relay operable in response to one signal to close its contacts and operable in response to another signal to open said contacts.

3. A single radio frequency remote control system according to claim 2 wherein said receiver includes means inactivating said other detector after receipt of a pulse modulated signal and a continuous signal.

4. A single radio frequency remote control system according to claim 2 wherein said receiver includes means for connection of a device to be energized, means including a semiconductor switch having a control electrode, an energy source for energizing said load and connections between said relay contact and said control electrode for closing said semiconductor switch when said relay contacts are closed.

5. A single radio frequency remote control system according to claim 1 wherein said transmitter includes a power supply adapted to be connected to an alternating current supply circuit and means connected with said circuit for feeding said radio frequency signals thereto and said receiver includes a power supply energized by said circuit and means connecting said detectors to said circuit for the receipt of said transmitted signals.

6. A single radio frequency remote control system according to claim 1 wherein said transmitter includes a power supply adapted for connection to an alternating current supply circuit, said supply having transformer means producing an output voltage, said modulator includes means connected with the output of said transformer and producing a first set of pulses in phase with said alternating current and a second set of pulses displaced in phase relative to said first pulses, means for selectively feeding said sets of pulses to said oscillator to simultaneously energize and modulate it, and wherein said detecting means in said receiver includes a power supply connected to said supply circuit, a demodulator powered by said supply, a dual coil latching relay having contact means movable to open and closed positions, a first pulse generator producing pulses in phase with said first set of pulses, a second pulse generator in phase with said second set of pulses, means connecting the first generator to one side of one coil and the second generator to one side of the other coil and means connecting said demodulator to the other side of each coil whereby the receipt of a set of pulses in phase with the pulses of said first generator will energize one coil to move the relay contacts to one position and receipt of another set of pulses in phase with the pulses of said second generator will energize the other coil to move the contacts to the other position.

7. A single frequency remote control system according to claim 6 wherein said oscillator includes means feeding said modulated signal into said alternating current circuit and said detecting means is connected to said circuit for the receipt of said modulated signal.

8. A single frequency remote control system according to claim 6 wherein said receiver includes a semiconductor switch having a control electrode, means for connection of a device to be controlled to the last said switch and a power source and means including a source of energy connecting said said relay contacts to said control electrode to cause the last said switch to close and energize said device when the contacts are closed and de-energize said device when the contacts are open.

9. A single frequency remote control system according to claim 6 wherein said power supply in said transmitter comprises a transformer having a primary winding connected to said circuit and a centertapped secondary winding, two pairs of diodes connected to said winding to provide full wave rectification and two separate sources of energy, a filter condenser filtering one of said energy sources and switching means connecting said sources to said oscillator whereby said switching means in one position applies unfiltered pulses to said oscillator and in the other position applies a signal corresponding to the difference between said sources of energy, said difference signal constituting a set of pulses displaced in phase from the unfiltered pulses by 90 degrees.

References Cited

UNITED STATES PATENTS

| | | | |
|---|---|---|---|
| 3,271,680 | 9/1966 | Reynolds | 325—37 |
| 3,316,488 | 4/1967 | Reynolds | 325—139 X |
| 3,369,078 | 2/1968 | Stradley | 179—15 XR |
| 2,862,056 | 11/1958 | Halvorson | 179—2.5 |
| 2,926,344 | 2/1960 | Koehler. | |
| 3,098,179 | 7/1963 | Van Rossum. | |

WILLIAM C. COOPER, Primary Examiner

U.S. Cl. X.R.

179—2.5; 325—37